Patented Mar. 28, 1933

1,902,854

UNITED STATES PATENT OFFICE

WILHELM HERZBERG, OF BERLIN-WILMERSDORF, AND HANS LANGE, OF BERLIN-FRIEDENAU, GERMANY, ASSIGNORS, BY MESNE ASSIGNMENTS, TO WINTHROP CHEMICAL COMPANY, INC., OF NEW YORK, N. Y., A CORPORATION OF NEW YORK

PROCESS OF MANUFACTURING SUBSTITUTED SECONDARY AMINES OF THE BENZYL-ANILID TYPE

No Drawing. Application filed April 13, 1926, Serial No. 101,792, and in Germany April 15, 1925.

This invention relates to the manufacture of substituted secondary amines of the benzyl-anilid type by the reaction of an aralkylamine with a halogenaryl-compound, in which the halogen is easily exchanged, for instance with dinitrochlorobenzene, 2-nitro-1-chlorobenzene-4-sulfonic acid, 4-nitro-1-chlorobenzene-2-sulfonic acid, in accordance with the equation:

$$R.CH_2.NH_2 + Hal.R' = R.CH_2.NH.R' + H.Hal$$

the conversion of the benzyl compound thus obtained into the corresponding benzal compound in the customary manner, and the decomposition the latter with a mineral acid.

The following examples illustrate the invention, without limiting it, the parts being by weight:

*Example 1.*—171 parts of the hydrochloride of 2.4-dimethylbenzylamine and 260 parts of sodium-4-nitro-1-chlorobenzene-2-sulfonate are dissolved in water, 106 parts of anhydrous sodium carbonate are added and the whole is boiled in a reflux apparatus for 2–3 hours. On cooling, yellow crystals of sodium-2'.4'-dimethyl-1-benzylamino-4-nitrobenzene-2-sulfonate separate, the separation being completed by adding common salt.

The reaction which takes place may be represented as follows:

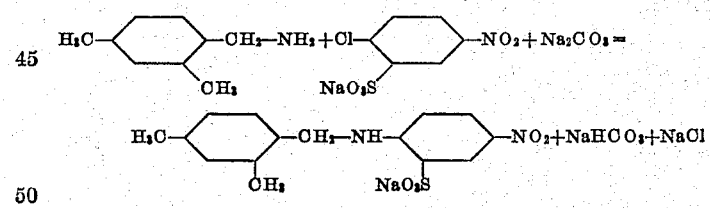

*Example 2.*—173 parts of the hydrochloride of 4-methoxybenzylamine (anisamine) and 260 parts of sodium 2-nitro-1-chlorobenzene-4-sulfonate are dissolved in water, and, after addition of 106 parts of anhydrous sodium carbonate, the whole is boiled in a reflux apparatus for 2–3 hours. On cooling and salting out sodium-4'-methoxy-1-benzylamino-2-nitrobenzene-4-sulfonate separates in yellow crystals.

*Example 3.*—95 parts of vanillylamine hydrochloride, 160 parts of potassium-2.6-dinitro-1-chlorobenzene-4-sulfonate and 35 parts of potassium carbonate are dissolved in water. While stirring, a further 35 parts of potassium carbonate are added gradually. The decomposition occurs in the cold and may be completed by warming for a short time. There are obtained orange-colored crystals of potassium - 4' - hydroxy - 3'-methoxy-1-benzylamino - 2.6-dinitrobenzene-4-sulfonate.

The reaction which takes place may be represented as follows:

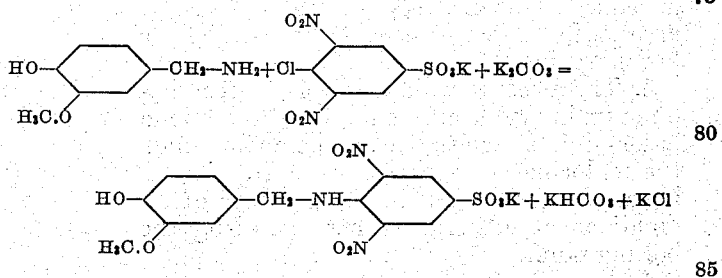

*Example 4.*—192 parts of 4-methyl-3-chlorobenzylamine hydrochloride and 260 parts of sodium-4-nitro-1-chlorobenzene-2-sulfonate are dissolved in water, 106 parts of anhydrous sodium carbonate are added and the whole is boiled in a reflux apparatus for a few hours. On cooling, sodium-4'-methyl-3'- chloro-1-benzylamino-4-nitrobenzene-2-sulfonate separates in yellow crystals.

*Example 5.*—157 parts of phenylethylamine hydrochloride and 260 parts of sodium-4-nitro-1-chlorobenzene-2-sulfonate are dissolved in water. 106 parts of anhydrous sodium carbonate are added and the whole is boiled for 2–3 hours in a reflux apparatus. Sodium-1-(phenylethylamino)-4-nitrobenzene-2-sulfonate separates.

*Example 6.*—157 parts of C-1-naphthylmethylamine, 260 parts of sodium-4-nitro-1-chlorobenzene-2-sulfonate and 53 parts of anhydrous sodium carbonate are dissolved in water and the solution is boiled in a reflux apparatus for a few hours; after cooling, there separates a yellow crystalline mass of sodium-C-1-naphthyl-1-methylamino-4-nitrobenzene-2-sulfonate.

The reaction which takes place may be represented as follows:

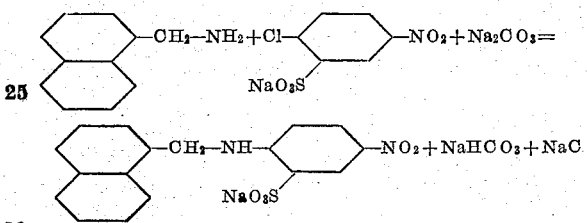

What we claim is:

1. The process which comprises reacting on a primary aralkylamine with a nitrochlor benzene compound in which the chlorine is easily exchanged, in an aqueous solution and in the presence of an alkali at a temperature not exceeding the boiling point.

2. The process which comprises reacting on vanillyl amine with an alkali metal salt of 2.6-dinitro-1-chlorobenzene-4-sulfonic acid in an aqueous solution and in the presence of an alkali at a temperature not exceeding the boiling point.

3. The process which comprises reacting on a primary aralkylamine with a mono chlor-dinitro benzene compound in which the chlorine is easily exchanged, in an aqueous solution and in the presence of an alkali at a temperature not exceeding the boiling point.

4. The process which comprises reacting on a primary aralkylamine with an alkali metal salt of a nitrochlor benzene sulfonic acid, in an aqueous solution and in the presence of an alkali at a temperature not exceeding the boiling point.

In testimony whereof we affix our signatures.

WILHELM HERZBERG.
HANS LANGE.